US008036599B2

(12) United States Patent
Walley

(10) Patent No.: US 8,036,599 B2

(45) Date of Patent: Oct. 11, 2011

(54) METHOD AND SYSTEM FOR A WIRELESS HEADSET WITH A CLOCK

(75) Inventor: John Walley, Ladera Ranch, CA (US)

(73) Assignee: Broadcom Corporation, Irvine, CA (US)

( * ) Notice: Subject to any disclaimer, the term of this patent is extended or adjusted under 35 U.S.C. 154(b) by 628 days.

(21) Appl. No.: 12/134,112

(22) Filed: Jun. 5, 2008

(65) Prior Publication Data

US 2009/0305631 A1 Dec. 10, 2009

(51) Int. Cl.
*H04B 7/00* (2006.01)

(52) U.S. Cl. ................. 455/41.2; 455/181.1; 455/171.1; 455/575.2; 375/345; 370/503

(58) Field of Classification Search ................. 455/41.2, 455/181.1, 171.1, 575.2, 231, 456, 575.1; 375/354, 356; 370/503; 705/3
See application file for complete search history.

(56) References Cited

U.S. PATENT DOCUMENTS

| | | | | |
|---|---|---|---|---|
| 6,346,911 | B1 * | 2/2002 | King | 342/357.62 |
| 6,711,151 | B1 * | 3/2004 | Ziegler | 370/350 |
| 6,718,395 | B1 * | 4/2004 | Ziegler | 709/248 |
| 6,763,226 | B1 * | 7/2004 | McZeal, Jr. | 455/90.2 |
| 6,795,421 | B1 * | 9/2004 | Heinonen et al. | 370/338 |
| 6,847,625 | B2 * | 1/2005 | Heinonen et al. | 370/338 |
| 7,123,877 | B2 * | 10/2006 | Lin | 455/41.2 |
| 7,215,976 | B2 * | 5/2007 | Brideglall | 455/552.1 |
| 7,274,761 | B2 * | 9/2007 | Muller et al. | 375/354 |
| D561,166 | S * | 2/2008 | Skurdal | D14/171 |
| 7,508,418 | B2 * | 3/2009 | Renkis | 348/211.2 |
| 7,529,237 | B2 * | 5/2009 | Ami et al. | 370/389 |
| 7,620,433 | B2 * | 11/2009 | Bodley | 455/575.2 |
| 7,668,588 | B2 * | 2/2010 | Kovacs | 600/509 |
| 7,835,767 | B2 * | 11/2010 | Satoh et al. | 455/556.1 |
| 2002/0131388 | A1 * | 9/2002 | Ami et al. | 370/338 |
| 2004/0209569 | A1 * | 10/2004 | Heinonen et al. | 455/41.2 |
| 2005/0091431 | A1 * | 4/2005 | Olodort et al. | 710/72 |
| 2006/0070107 | A1 * | 3/2006 | Renkis | 725/105 |
| 2006/0212938 | A1 * | 9/2006 | Suzuki | 726/16 |
| 2007/0042821 | A1 * | 2/2007 | Lee et al. | 455/575.6 |
| 2007/0093279 | A1 * | 4/2007 | Janik | 455/569.1 |
| 2008/0152183 | A1 * | 6/2008 | Janik et al. | 381/375 |
| 2008/0226151 | A1 * | 9/2008 | Zouridakis et al. | 382/133 |
| 2008/0285536 | A1 * | 11/2008 | Kaidar et al. | 370/345 |
| 2008/0291863 | A1 * | 11/2008 | Agren | 370/315 |
| 2008/0291891 | A1 * | 11/2008 | Jerlhagen et al. | 370/350 |
| 2008/0304639 | A1 * | 12/2008 | McDonough et al. | 379/93.01 |
| 2009/0003620 | A1 * | 1/2009 | McKillop et al. | 381/80 |
| 2009/0231960 | A1 * | 9/2009 | Hutcheson | 368/10 |
| 2010/0228137 | A1 * | 9/2010 | Gu | 600/508 |
| 2010/0261465 | A1 * | 10/2010 | Rhoads et al. | 455/420 |
| 2010/0303185 | A1 * | 12/2010 | Haartsen | 375/362 |

* cited by examiner

*Primary Examiner* — Minh D Dao

(74) *Attorney, Agent, or Firm* — McAndrews, Held & Malloy, Ltd.

(57) ABSTRACT

Aspects of a method and system for a Bluetooth headset with a clock are provided. A Bluetooth headset may have an access to real-time clock information such as a real-time clock value at a specific time instant and generate corresponding audio and/or visual representations to a user via Bluetooth communication. The real-time clock information to the Bluetooth headset may be originated within or external to the Bluetooth headset. The timing of the real-time clock of the Bluetooth headset may be maintained by a Bluetooth clock of the BT headset. The Bluetooth headset may provide respective real-time updates by pressing a button on the Bluetooth headset or from timing events such as calendar entries or personal alarms downloaded into the BT headset from a Bluetooth device, and/or from timed Bluetooth messages communicated to the Bluetooth headset from the peer device.

15 Claims, 5 Drawing Sheets

METHOD AND SYSTEM FOR A WIRELESS HEADSET WITH A CLOCK

CROSS-REFERENCE TO RELATED APPLICATIONS/INCORPORATION BY REFERENCE

Not Applicable.

FIELD OF THE INVENTION

Certain embodiments of the invention relate to wireless communication. More specifically, certain embodiments of the invention relate to method and system for a Bluetooth headset with a clock.

BACKGROUND OF THE INVENTION

Bluetooth is a technology standard for short-range wireless connectivity between all kinds of mobile or stationary electronic devices, such as cellular phones, cameras, PDAs, wireless headsets, laptops and/or computers. The Bluetooth wireless technology operates via a radio transceiver in a globally available license-free frequency band, ensuring communication compatibility worldwide. Bluetooth chips are small, low-cost modules, which are built into devices, allowing a fast and secure transmission of voice and data through a radio link.

Bluetooth is a low-cost wireless technology that enables users with Bluetooth-enabled devices, such as headphones and/or speakers, to communicate voice and data over a very short range. For example, a Bluetooth headset or Bluetooth speakerphone paired with a cell phone may allow hands free communication via the cell phone. In this regard, the user does not have to hold the phone to their ear during a call, but instead using a Bluetooth enabled headset or speakerphone for listening and/or speaking. The user is therefore free to perform other activities.

A growing number of mobile users rely on their cell phones to provide time. As a result, many mobile users do not wear a watch. Even in instances where a mobile user may be wearing a watch, the watch may be concealed under clothes such as a short or jacket. Accordingly, there may be instances when it may be inconvenient to determine the time from their watch. With the advent of Bluetooth headsets, a growing number of cell phone users keep their cell phone in their pockets, in a bag, in a pouch, and/or strapped to their belts. Hence, it may sometimes be inconvenient to retrieve the cell phone to determine the time.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method is provided for a Bluetooth headset with a clock, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in method and system for a Bluetooth headset with a clock. Various exemplary aspects of the invention may comprise a Bluetooth device such as a BT headset having an access to real-time clock information such as a real-time clock value at a specific time instant and generate a corresponding audio and/or visual representation to a user via Bluetooth communication. The real-time clock information to the BT headset may be originated from a peer Bluetooth device such as a BT cell phone via a Bluetooth-protocol message. The BT headset may process the received Bluetooth-protocol message and generate an alert to inform the user of corresponding real-time updates. The real-time clock information may also be originated within the Bluetooth headset. A real-time clock within the BT headset may be enabled to produce various real-time clock values at respective time instants. According to various timing events, the BT headset may be enabled to present the generated real-time clock values at respective time instants to users via, for example, a microphone and/or a display associated with the BT headset. The timing of the real-time clock of the BT headset may be maintained by using a Bluetooth clock of the BT headset. The timing events may comprise, for example, the pressing of a button on the BT headset for getting a time update, calendar entries or personal alarms downloaded into the BT headset from the BT cell phone, and/or timed Bluetooth messages to the BT headset from the BT cell phone.

Figure 1:
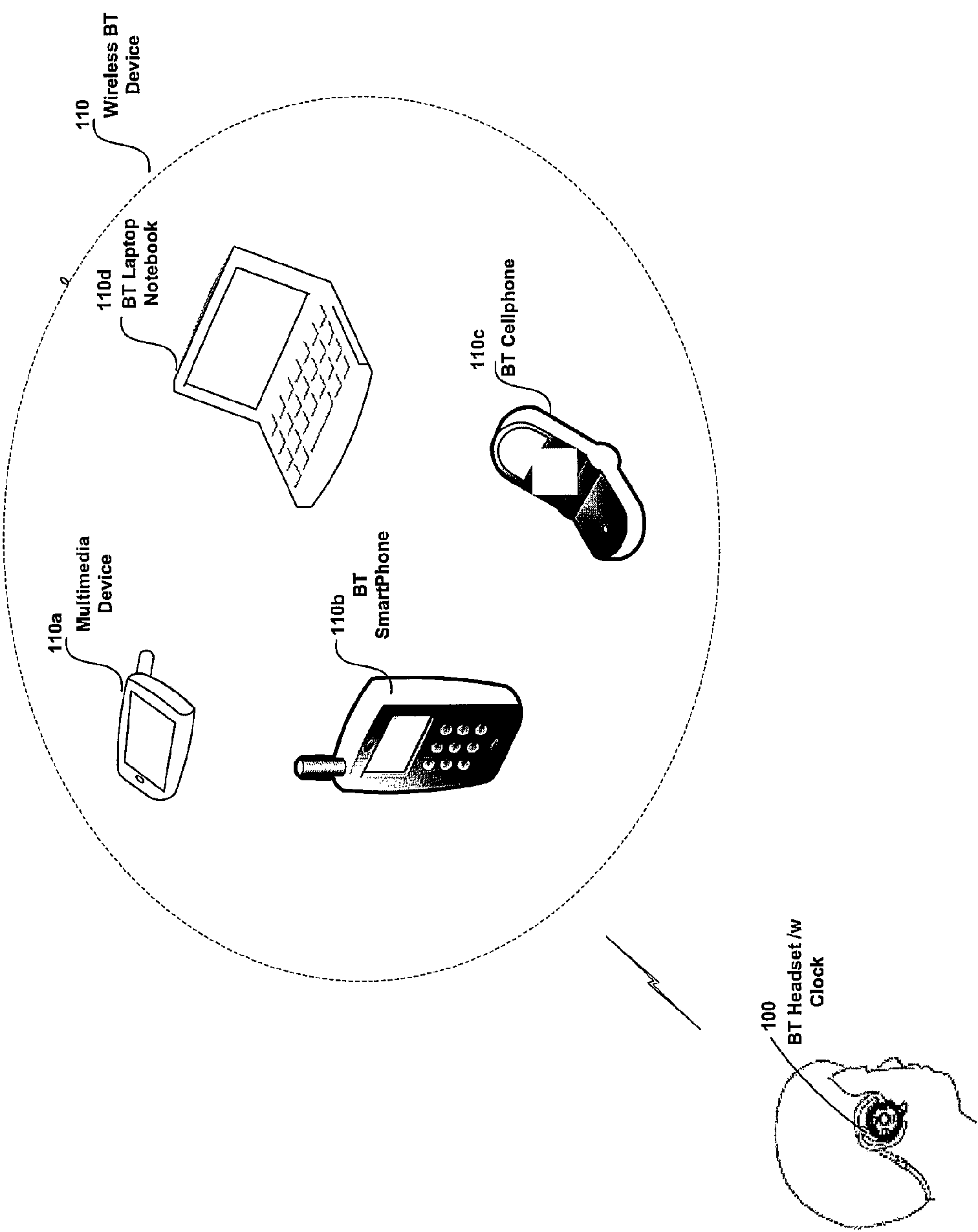
FIG. 1 is a block diagram of an exemplary Bluetooth headset with a clock, in accordance with an embodiment of the invention.

FIG. 1 is a block diagram of an exemplary Bluetooth headset with a clock, in accordance with an embodiment of the invention. Referring to FIG. 1, there is shown a BT headset 100, a BT device 110 such as a BT multimedia device 110*a*, a BT smart phone 110*b*, a BT cellular phone 110*c*, and a BT laptop notebook 110*d*.

The BT device 110 may comprise suitable logic circuitry and/or code that may be enabled to generate electrical signals representative of audio signals and may communicate these generated electrical signals to the headset 100. The BT device 110 may have an integrated real-time clock and may be enabled to communicate real-time information such as a time of day and/or timed messages to the headset 100. The BT device 110 may be the BT smart phone 110*b*, or the BT cellular phone 110*c*, or the BT laptop notebook 110*d*.

The BT headset 100 may comprise suitable logic circuitry and/or code that may be enabled to receive electrical signals representative of audio signals and may convert these received electrical signals to audible signals. The BT headset 100 may be coupled to the BT device 110 such as the BT multimedia device 110*a* to listen to some audio content such as music and speech. In this regard, the BT headset 100 may have the capability to have a real-time clock. The BT headset 100 may be used as a timekeeping device to provide a time update in lieu of the BT multimedia device 110*a*. Clock alarm functions may be combined into the BT headset 100. The clock alarm functions may be enabled automatically or manually such as, for example, by the pressing of a button on the BT headset 100. A user of the BT headset 100 may get an updated time alarm by manually pressing a button on the BT headset 100, or automatically via an hourly chime depending on respective configuration settings, and/or based on various timing events. Exemplary timing events may comprise timed messages communicated to the BT headset 100, time information such as calendar entries, and/or personal alarms downloaded into the BT headset 100. The BT headset 100 may be enabled to check against a list of timing events to wake up and communicate with the BT cell phone 110*c* or just wake up on its own and determine the time of the day. The real-time clock of the BT headset 100 may be maintained by, for example, a free-running Bluetooth clock operating at 3.2 kHz. The BT headset 100 may present the time alarm update without having a real-time Bluetooth interface, for example, via announcing the time of day acoustically and/or visually.

Figure 2:
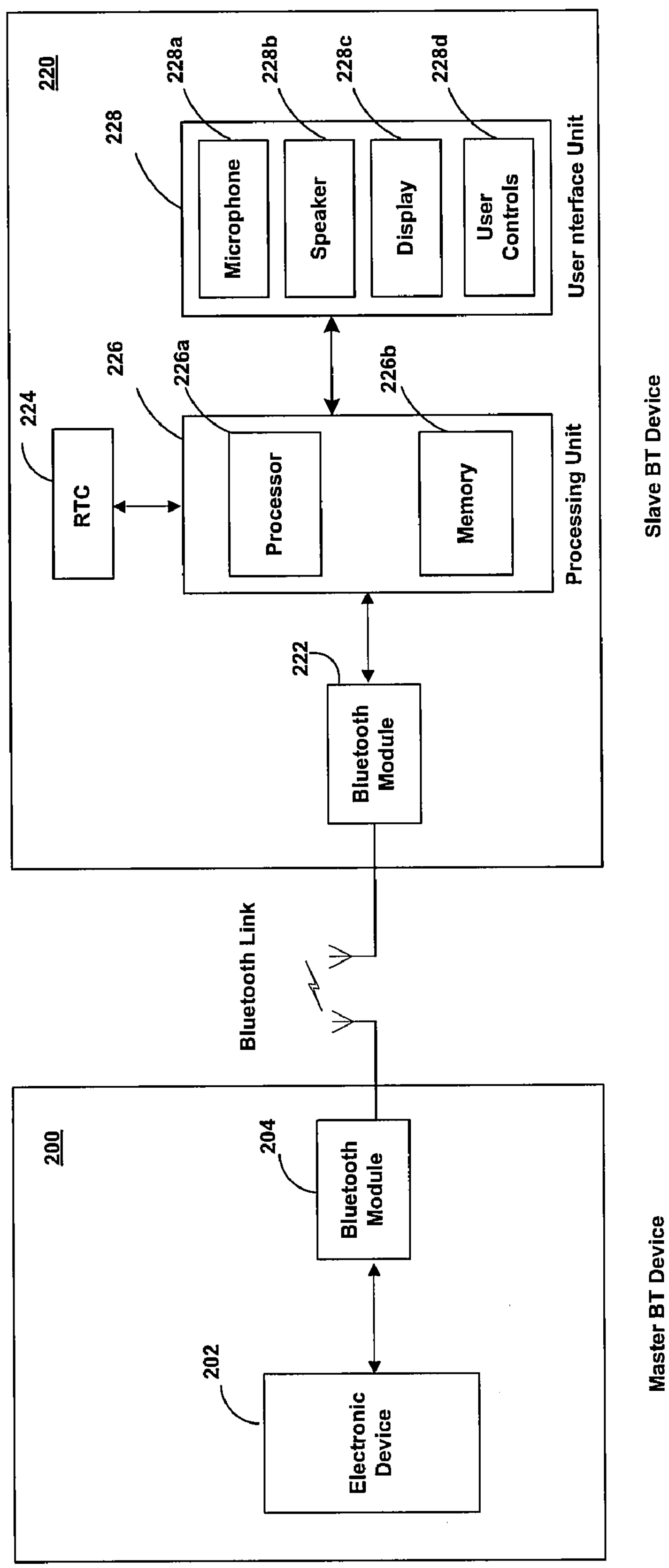
FIG. 2 is a block diagram that illustrates an exemplary Bluetooth point-to-point connection, in accordance with an embodiment of the invention.

FIG. 2 is a block diagram that illustrates an exemplary Bluetooth point-to-point connection, in accordance with an embodiment of the invention. Referring to FIG. 2, there is shown a master BT device 200 and a slave BT device 220. The master BT device 200 may comprise an electronic device 202 and a Bluetooth module 204. The slave BT device 220 may comprise a Bluetooth module 222, a RTC 224, a processing unit 226, and a user interface unit 228. The processing unit 226 may comprise at least one processor 226*a* and a memory 226*b*. The user interface unit 228 may comprise a plurality of associated components such as a microphone 228*a*, a speaker 228*b*, a display 228*c*, and a user control 228*d*.

The master BT device 200 may comprise the electronic device 202 such as, for example, the BT multimedia device 110*a* and the BT cell phone 110*c*, and their equivalents, and the Bluetooth module 204 to support data delivery over the Bluetooth air-interface. The electronic device 202 may communicate with the Bluetooth module 204 using Bluetooth protocol.

The slave Bluetooth device 220 may be the BT headset 100 or and its equivalents. The Bluetooth module 222 may support data communication over the Bluetooth air-interface. The RTC 224 (real-time clock) may comprise suitable logic, circuitry, and/or code that enable a real-time clock for the BT headset 100. The RTC 100 may be maintained by, for example, the Bluetooth clock of the BT headset 100, and may be reset via the user interface 228 or via some timed application events. The processor 226*a* may comprise suitable logic, circuitry and/or code that may provide control instructions for processing received signals and adjust the audible and visual alarm signals based upon the operating environment. The processor 226*a* may be enabled to read and/or write real-time values from/to the RTC 224. The memory 226*b* may comprise suitable logic, circuitry, and/or code that enable storing information such as executable instructions and data that may be utilized by the processor 226*a*. The executable instructions may comprise algorithms that may be enabled to report real-time clock values automatically or upon request. The memory 226*b* may comprise RAM, ROM, low latency nonvolatile memory such as flash memory and/or other suitable electronic data storage. The microphone 228*a* may comprise suitable logic, circuitry, and/or code that generate audio prompts to provide audio indicators to the BT headset 110 on a real-time update request from the user. The speaker 228*b* may comprise suitable logic, circuitry, and/or code that enable the user to hear an audio alarm of, for example, the requested real-time update. The display unit 228*c* may comprise suitable logic, circuitry, and/or code that may enable presenting or displaying graphics and/or text. The user controls 228*d* may comprise suitable logic, circuitry and/or code that may be used to enter user input, for example, a request to read and/or write a real-time clock value at a specific instance.

In operation, in instances where a real-time clock value reporting may be originated from the master Bluetooth device 200. The master Bluetooth device 200 may notify the slave Bluetooth device 220 of a real-time clock update by via a Bluetooth-protocol message. The message may be a link manager message. The payload of the link manager message may comprise an indication of a real-time clock value and an indication of an instance which may correspond to the indicated real-time clock value. In instances where the Bluetooth module 222 of the slave Bluetooth device 220 may receive the message, the processing unit 226 may generate signals to trigger the audio alarm 230 to present the received real-time clock update. In instances where the received signal may comprise alphanumeric information, the alphanumeric information may be displayed on the display 228*c*, as determined by user settings. User settings may be entered by means of the user controls 228*d*.

In operation, in instances where the real-time clock value reporting may be originated from the slave Bluetooth device 220. The processing unit 226 may be triggered by, for example, an incoming user control message via the user controls 228*d*, or a timing event such as a calendar entry and/or an alarm and/or device configuration on respective time update settings. The processing unit 226 may generate a Bluetooth command indicating the RT reading request and pass to the Bluetooth module 222. The Bluetooth module 222 may respond the Bluetooth command with a Bluetooth event to the requested RT reading and pass the Bluetooth event to the processing unit 226. The processing unit 226 may access the RTC 224 to read the real-time clock value accordingly. The processing unit 226 may generate an alert at the microphone 228*a* to inform a user on the real-time update. In instances where the received signal may comprise alphanumeric information, the alphanumeric information may be displayed on the display 228*c* accordingly.

Figure 3:
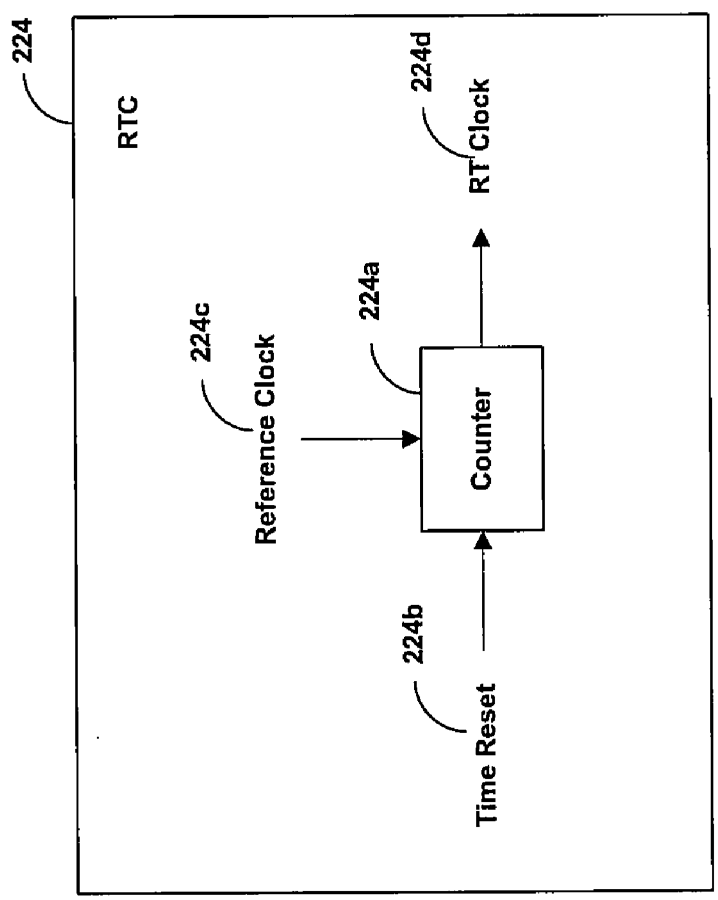
FIG. 3 is a block diagram that illustrates an exemplary RTC, in accordance with an embodiment of the invention.

FIG. 3 is a block diagram that illustrates an exemplary RTC, in accordance with an embodiment of the invention. Referring to FIG. 3, there is shown a counter 224*a*, a time reset 224*b*, a reference clock 224*c*, and a RT clock 224*d*. The counter 224 may comprise suitable logic, circuitry, and/or code that may enable producing the RT clock 224*d* to the processing unit 224 for supporting a real-time reporting feature on the BT headset 100. The reference clock 224*c* may provide timing information to enable the counter 224*a* to actually count instances in time. In this regard, the free running Bluetooth clock of the BT headset 100 may be used for the reference clock 224*c*. The time reset 224*b* may be initially or regularly loaded into the counter 224*a* to serve as a real-time reference point. The instantaneous contents of the counter 224*a* may be generated by $$t_i = t_0 + \sum_{k=0}^{i} T_{ref},$$

where i may be the locally accumulated counting index, $T_{ref}$ may be the time period of the reference clock 224*c*, $t_0$ may be the real-time reference point provided by the time reset 224*b*. The instantaneous content of the counter 224*a* at $t_i$ may provide the value of $t_i$, which may be read by the processing unit 224 for a real-time clock update on the BT headset 100.

Figure 4:
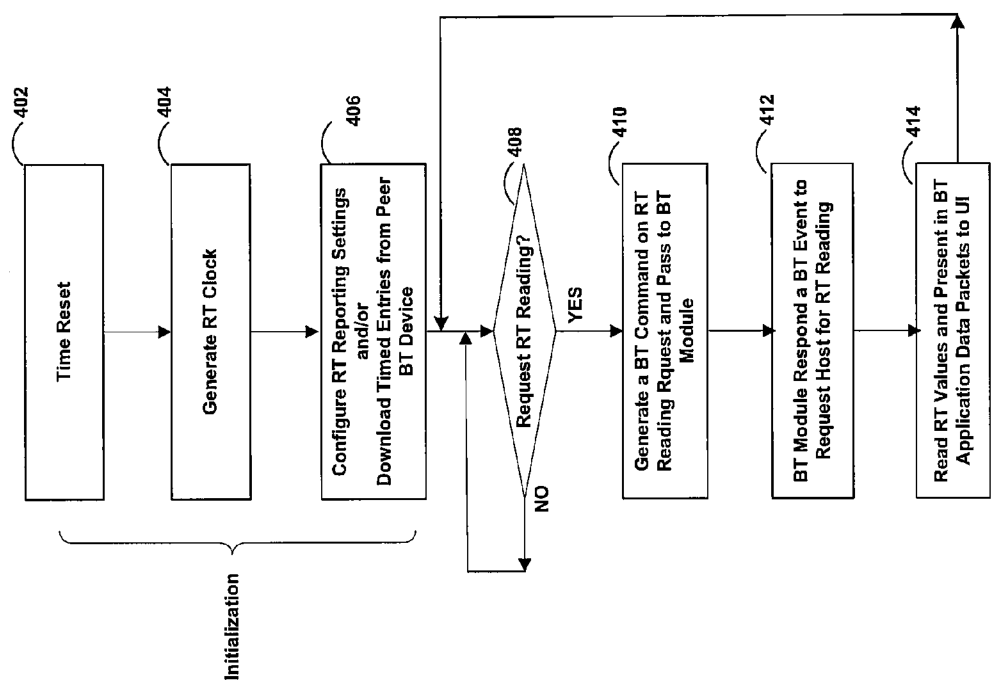
FIG. 4 is a flow chart that illustrates exemplary steps for a Bluetooth headset real-time clock reporting originated from the Bluetooth headset, in accordance with an embodiment of the invention.

FIG. 4 is a flow chart that illustrates exemplary steps for a Bluetooth headset real-time clock reporting originated from the Bluetooth headset, in accordance with an embodiment of the invention. Referring to FIG. 4, the exemplary steps may begin in step 402, where the Bluetooth headset 220 may load the time reset 224*b* into the RTC 226. In step 404, the RT clock 224*d* may be generated based on the time reset in step 402 and the reference clock 224*c*. In step 406, The BT headset 100 may be configured for certain real-time reporting settings. For example, the BT headset 100 may wake up and do a time of day every 10 seconds. The BT headset 100 may get real-time reporting timing information by optionally downloading time entries such as a calendar and personal alarms from its peer BT device such as the BT cellular phone 110*c*.

In step 408, in instances where a RT reading may be requested or triggered, then in step 410, the processing unit 226 may generate a BT command indicating the received RT request and pass to the Bluetooth module 222. In step 412, the Bluetooth module 222 may respond the BT command with a BT event to request the host of the BT headset doing the RT reading. In step 414, the processing unit 226 may read respective real-time values from the RTC 224 and pass to the user interface via a BT application layer. The processing unit 226 may generate an alert at the microphone 228*a* and/or on the display 228*c* to inform the user about the real-time update. The next step may be step 408. In step 408, in instances where a RT reading may be not requested or triggered, then stay in step 408.

Figure 5:
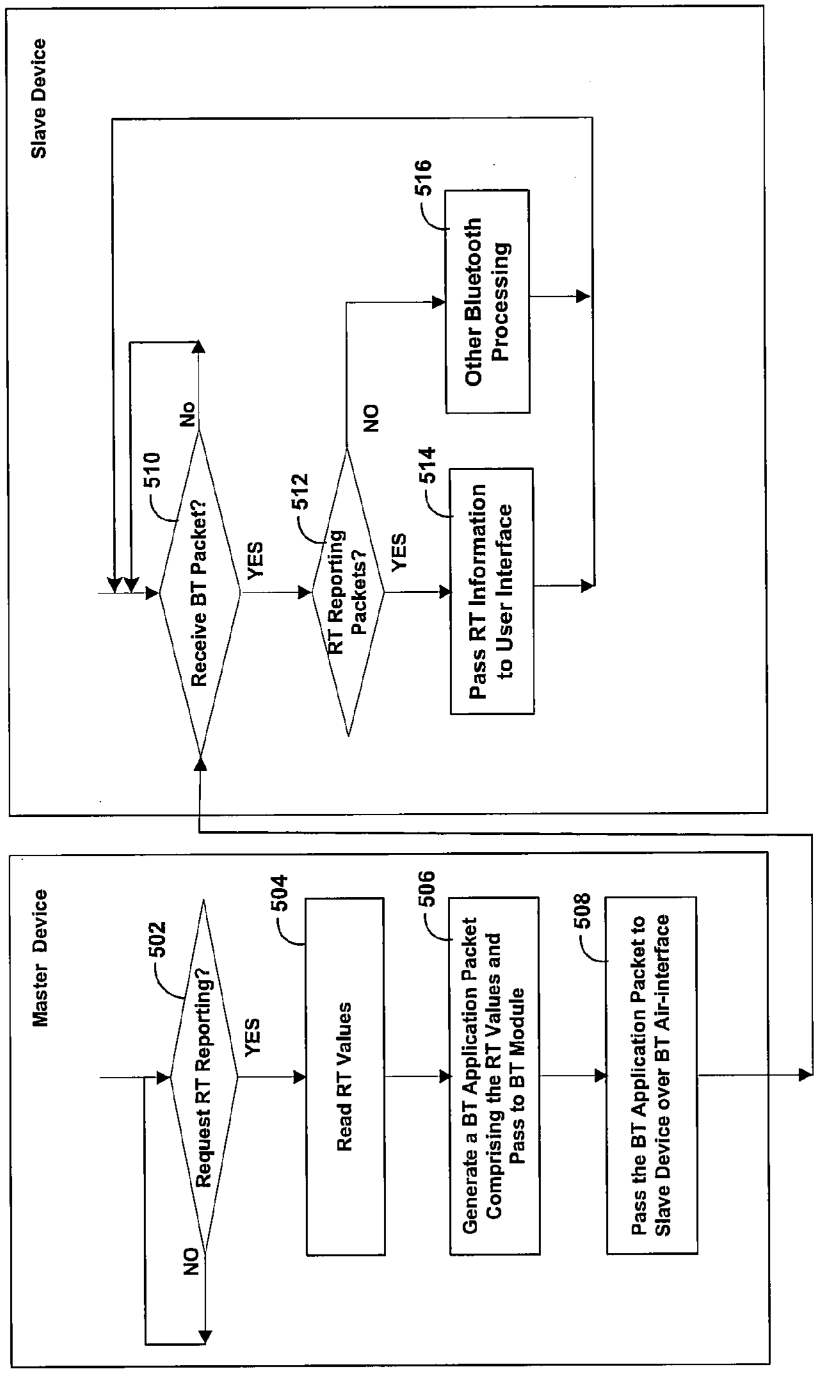
FIG. 5 is a flow chart that illustrates exemplary steps for a Bluetooth headset real-time clock reporting originated from a Bluetooth enabled device connected to the Bluetooth headset, in accordance with an embodiment of the invention.

FIG. 5 is a flow chart that illustrates exemplary steps for a Bluetooth headset real-time clock reporting originated from a Bluetooth enabled device connected to the Bluetooth headset, in accordance with an embodiment of the invention. Referring to FIG. 5, the exemplary steps may begin in step 502, where the master device such as the BT cellular phone 110*c* may check whether there may be a request of RT reporting RT to a slave device such as the BT headset 100. In instances where a RT reporting to the BT headset 100 may be requested or triggered, then in step 504, the BT cellular phone 110*c* may read respective RT values. In step 506, a BT application packet comprising the RT values read in step 504 may be generated and pass down to the Bluetooth module 204. The Bluetooth module 204 may then pass the BT packet to the BT headset 100 over the Bluetooth air-interface.

In step 510, the BT headset 100 may check whether a BT packet is received from the BT cellular phone 110*c*. In a BT packet is not received, then step 510 is again executed. In instances where a BT packet may be received at the BT headset 100 from the BT cellular phone 110*c*, then in step 512, it may be determined whether the received BT packet may be the RT reporting packet. If the received BT packet is a RT reporting packet, then in step 514, the received RT information may be passed to the user interface 228 to enable generation of an audio announcement for the RT information, or it may be passed to the display 228*c* for a visual presentation on the received RT information. If the received BT packet is not a RT reporting packet, then in step 516, other BT processing may occur. Subsequent to steps 514 and 516, step 510 may be executed.

Aspects of a method and system for a Bluetooth headset with a clock are provided. In accordance with various embodiments of the invention, the Bluetooth headset 100 may have an access to real-time clock information such as a real-time clock value at a specific time instant and generate a corresponding audio and/or visual representation to user. The real-time clock information to the BT headset 100 may be originated from its peer Bluetooth device such as the BT cell phone 110*c*. The BT cell phone 110*c* may notify the BT headset 100 of the real-time clock information via a Bluetooth-protocol message. The processing unit 226 of the BT headset 100 may process the received Bluetooth-protocol message and generate an alert at the microphone 228*a* and/or the display 228*c* to inform user on corresponding real-time updates. The real-time clock information may also be originated within the Bluetooth headset 100. The RTC 224 in the BT headset 100 may be enabled to produce various RT clock values at respective time instants. According to various timing events, the processing unit 226 may be enabled to access the RTC 224 to read the generated RT clock values at respective time instants and present the RT clock values or a representation thereof to users via, for example, the microphone 228*a* and/or the display 228*c*. The timing of the RTC 224 may be maintained by using the Bluetooth clock of the BT headset 100. The timing events may be, for example, pressing a button via the user controls 228*d* in the BT headset 100 for getting a time update, calendar entries or personal alarms downloaded into the BT headset 100 from the BT cell phone 110*c*, and/or timed Bluetooth messages to the BT headset 100 from the BT cell phone 100*c*.

Another embodiment of the invention may provide a machine-readable storage, having stored thereon, a computer program having at least one code section executable by a machine, thereby causing the machine to perform the steps as described herein for a Bluetooth headset with a clock.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method providing time, the method comprising:

generating via a peer Bluetooth device of a Bluetooth device, an audio and/or visual representation of a real-time clock value that corresponds to a specific time instant based on real-time clock information accessed by said Bluetooth device.

2. The method according to claim 1, wherein said real-time clock information is generated within said Bluetooth device.

3. The method according to claim 1, wherein said real-time clock information is generated external to said Bluetooth device.

4. The method according to claim 1, wherein said real-time clock information is generated via a Bluetooth clock of said Bluetooth device.

5. The method according to claim 1, wherein said real-time clock information is generated based on a timing event within and/or external to said Bluetooth device.

6. A system for wireless communication, the system comprising:

one or more circuits that generates via a peer Bluetooth device of a Bluetooth device, an audio and/or visual representation of a real-time clock value that corresponds to a specific time instant based on real-time clock information accessed by said Bluetooth device.

7. The system according to claim 6, wherein said real-time clock information is generated within said Bluetooth device.

8. The system according to claim 6, wherein said one or more circuits generates said real-time clock information external to said Bluetooth device.

9. The system according to claim 6, wherein said real-time clock information is generated via a Bluetooth clock of said Bluetooth device.

10. The system according to claim 6, wherein said real-time clock information is generated based on a timing event within and/or external to said Bluetooth device.

11. A non-transitory computer-readable medium having stored thereon, a computer program having at least one code section for providing time, the at least one code section being executable by a machine for causing the machine to perform steps comprising:

generating via a peer Bluetooth device of Bluetooth device, an audio and/or visual representation of a real-time clock value that corresponds to a specific time instant based on real-time clock information accessed by said Bluetooth device.

12. The non-transitory computer-readable medium according to claim 11, wherein said real-time clock information is generated within said Bluetooth device.

13. The non-transitory computer-readable medium according to claim 11, wherein said real-time clock information is generated external to said Bluetooth device.

14. The non-transitory computer-readable medium according to claim 11, wherein said real-time clock information is generated via a Bluetooth clock of said Bluetooth device.

15. The non-transitory computer-readable medium according to claim 11, wherein said real-time clock information is generated based on a timing event within and/or external to said Bluetooth device.

* * * * *

UNITED STATES PATENT AND TRADEMARK OFFICE

CERTIFICATE OF CORRECTION

PATENT NO. : 8,036,599 B2
APPLICATION NO. : 12/134112
DATED : October 11, 2011
INVENTOR(S) : Walley It is certified that error appears in the above-identified patent and that said Letters Patent is hereby corrected as shown below:

Column 8, Line 12, insert --a-- after the word “of”

Signed and Sealed this
Seventeenth Day of April, 2012

David J. Kappos
*Director of the United States Patent and Trademark Office*